United States Patent
Heylen et al.

(10) Patent No.: US 6,839,312 B2
(45) Date of Patent: Jan. 4, 2005

(54) COPY PROTECTION OF DIGITAL AUDIO COMPACT DISCS

(75) Inventors: Richard A A Heylen, Leeds (GB); Roger Edward, Reading (GB)

(73) Assignee: Macrovision Corporation, Santa Clara, CA (US)

(*) Notice: Subject to any disclaimer, the term of this patent is extended or adjusted under 35 U.S.C. 154(b) by 470 days.

(21) Appl. No.: 09/958,461

(22) PCT Filed: Feb. 14, 2001

(86) PCT No.: PCT/GB01/00621

§ 371 (c)(1),
(2), (4) Date: Oct. 5, 2001

(87) PCT Pub. No.: WO01/61696

PCT Pub. Date: Aug. 23, 2001

(65) Prior Publication Data

US 2002/0159355 A1 Oct. 31, 2002

(30) Foreign Application Priority Data

Feb. 15, 2000 (GB) .............................. 0003531

(51) Int. Cl.[7] .................................. G11B 3/90
(52) U.S. Cl. .................. 369/53.21; 369/53.12; 369/124.07; 369/275.3
(58) Field of Search .............. 369/47.12, 47.14, 369/47.15, 47.21, 47.22, 53.12, 53.2, 53.21, 53.31, 53.35, 53.36, 53.42, 53.44, 59.23, 59.24, 59.25, 124.07, 124.08, 275.3

(56) References Cited

U.S. PATENT DOCUMENTS 6,005,839 A 12/1999 Hideo et al.

FOREIGN PATENT DOCUMENTS

| EP | 0899733 | 9/1999 |
| WO | WO98 03973 | 1/1998 |
| WO | WO98 52114 | 11/1998 |
| WO | WO 0074053 | 12/2000 |

OTHER PUBLICATIONS

Patent Abstracts of Japan vol. 010 No 072 (p–438), Mar. 22, 1996&JP 60 211534 A(Tokyo Denki KK Oct. 23, 1995.
Patent Abstracts of Japan vol. 011No 328 (p629), Oct. 27, 1987 6&JP 62 111321A(Onken:KK May 22, 1997Patent Abstracts of Japan vol. 010 No 072 (p–438), Mar. 22, 1996&JP 60 211534 A(Tokyo Denki KK Oct. 23, 1995.

Primary Examiner—Paul W. Huber
(74) Attorney, Agent, or Firm—Jim H. Salter

(57) ABSTRACT

The ability of a data reader, such as a CD-ROM drive, to access, extract, or otherwise read the data on a digital audio compact disc provides a problem for the music industry. A user can use his CD-ROM drive to read the data from an audio disc into a computer file, and then that data can be copied. To provide copy protection, errors are deliberately introduced into the data on a CD, but these errors are of a type which are generally transparent to an audio player but which will interfere with the reading of the audio data by a data reader. According to the standards, the data on a CD is encoded into frames by EFM (eight to fourteen modulation). Each frame has sync data, sub-code bits providing control and display symbols, data bits and parity bits, and includes 24 bytes of data, which is audio data for a CD-DA. The standard requires that 98 such frames are grouped into a sector. To provide copy protection, each is provided with a non-standard number of frames, for example, has 99 rather than 98 frames. Then the S0 and S1 sub-code synchronisation patterns are placed one frame later than they otherwise would be, but the data within each frame remains the same. An audio player would divide the 24 bytes of data from each frame of the sector into 4 byte samples and continue playing the disc, albeit with an inaccurate time display. However, a data reader used to read audio data from the CD-DA to enable a copy to be made, would produce a copy having a degraded quality of sound.

12 Claims, 5 Drawing Sheets

STANDARD SECTOR EXAMPLE

GREATER THAN 98 FRAME NON-STANDARD SECTOR EXAMPLE

AUDIO ONLY PLAYER

COPY PROTECTION OF DIGITAL AUDIO COMPACT DISCS

This application is a 371 of PCT/GB01/00621, filed Feb. 14, 2001.

The present invention relates to a method of copy protecting a digital audio compact disc, and to a copy protected digital audio compact disc.

Digital audio compact discs (CD-DA) which carry music or other audio can be played or read by more sophisticated apparatus, such as CD-ROM drives. This means, for example, that the data on a CD-DA acquired by a user may be read into a PC by way of its ROM drive and thus copied onto another disc or other recording medium. The increasing availability of recorders able to write to CDs is therefore an enormous threat to the music industry.

In an earlier proposed method, a digital audio compact disc is copy protected by rendering control data encoded onto the disc incorrect and/or inaccurate. The incorrect data encoded onto the CD is either inaccessible to, or not generally used by, a CD-DA player. Therefore, a legitimate audio CD bought by a user can be played normally on a compact disc music player. However, the incorrect data renders the CD unplayable by a CD-ROM drive.

However, as the audio compact disc is rendered unplayable on a CD-ROM drive, the user is also prevented from using the CD-ROM drive legitimately simply to play the music or other audio on the disc.

It clearly would be advantageous to provide a method of copy protection for a digital audio compact disc which, whilst preventing the production of usable copy discs, would not prevent or degrade, the playing of legitimate audio discs on all players having the functionality to play audio discs.

According to a first aspect of the present invention there is provided a method of copy protecting a digital audio compact disc, wherein control data is encoded on the compact disc, the copy protection method comprising the step of rendering selected control data incorrect and/or inaccurate whereby the incorrect and/or inaccurate control data interferes with the reading of audio data from the digital audio compact disc.

Generally, the incorrect and/or inaccurate control data is arranged such that it cannot be corrected by the error correction arrangements of available data readers. The error correction arrangements of some data readers may ostensibly provide "corrections", but will thereby incorrectly render any data extracted. Other data readers will be prevented from extracting the data because of their inability to correct the errors.

With an embodiment of the invention, the incorrect data encoded onto the CD would either be ignored or would otherwise not generally have an effect on the playing of the audio data on the disc. Therefore, a legitimate audio CD bought by a user can be played normally on any player able to play audio data. However, if a copy of the copy protected CD is made by reading the audio data, playing of that copy CD is either prevented or the sound it is able to produce is degraded.

In the description and claims of this specification, the term "audio player" is used to refer to players and drives arranged or controlled to play the audio data on a digital audio compact disc. Such players will include, therefore, commercially available CD music players which function solely to play the music or other audio on the CD. It is required that the incorrect data encoded onto the CD does not generally impinge on, or effect the normal operation of such an "audio player".

In the description and claims of this specification, the term "data reader" is used to refer to all players and drives arranged or controlled to read the data on the disc, for example, by extracting or otherwise accessing the data, on the disc. Such players will include, therefore, CD-ROM drives when configured or controlled to read or extract data from the disc. In this respect, it is required to enable a CD-ROM drive, for example, to play a legitimate CD-DA, but to prevent such a CD-ROM drive from being used to make a usable copy of the disc.

In an embodiment of a method of the present invention, the data encoded on the compact disc which has been rendered incorrect is the structure of a data sector on the compact disc.

A method of the present invention may additionally and/or alternatively have other control data which is incorrect and/or inaccurate.

It is well known that the data on a compact disc is encoded into frames, and conventionally 98 such frames are grouped into a sector. In a preferred embodiment of a method of the present invention, the number of frames grouped in each sector is changed from the standard.

The applicants have established that the sound reproduced on an audio player from a compact disc having 97 or 99 frames per sector does not suffer any degradation in quality. By contrast, if the data which has been recorded in this way is re-recorded by use of a data reader the quality of the sound is degraded. Missing samples show up as phase noise which tends to be unpleasant.

Clearly, the number of frames per sector can be chosen as required, to meet the particular circumstances.

Preferably, the control data encoded on the compact disc is altered prior to mastering of the disc. Specifically, the encoder used in the mastering process has its parameters changed to change the frame structure of the mastered disc.

The present invention also extends to a copy protected digital audio compact disc, wherein control data is encoded on the compact disc, and wherein selected control data has been rendered incorrect and/or inaccurate, the incorrect and/or inaccurate control data being arranged to interfere with the reading of audio data from the digital audio compact disc.

Generally, the incorrect and/or inaccurate control data is arranged such that it cannot be corrected by the error correction arrangements of available data readers.

In a preferred embodiment of a copy protected digital audio compact disc of the present invention, the data is encoded on the compact disc in frames, and the frames are grouped in sectors, wherein there is a non-standard number of frames in each sector.

A copy protected digital audio compact disc of the invention may have non-standard sectors only, or may have other control data which is incorrect and/or inaccurate.

Embodiments of the present invention will hereinafter be described, by way of example, with reference to the accompanying drawings, in which.

A digital audio compact disc (CD-DA), which carries music and is to be played on an audio player such as a conventional CD disc player, is made and recorded to a standard format known as the Red Book standards. As well as defining physical properties of the disc, such as its dimensions, and its optical properties, such as the laser wavelength, the Red Book also defines the signal format and the data encoding to be used.

As is well known, the use of the Red Book standards ensure that any CD-DA produced to those standards will play on any audio player produced to those standards.

Figure 1:
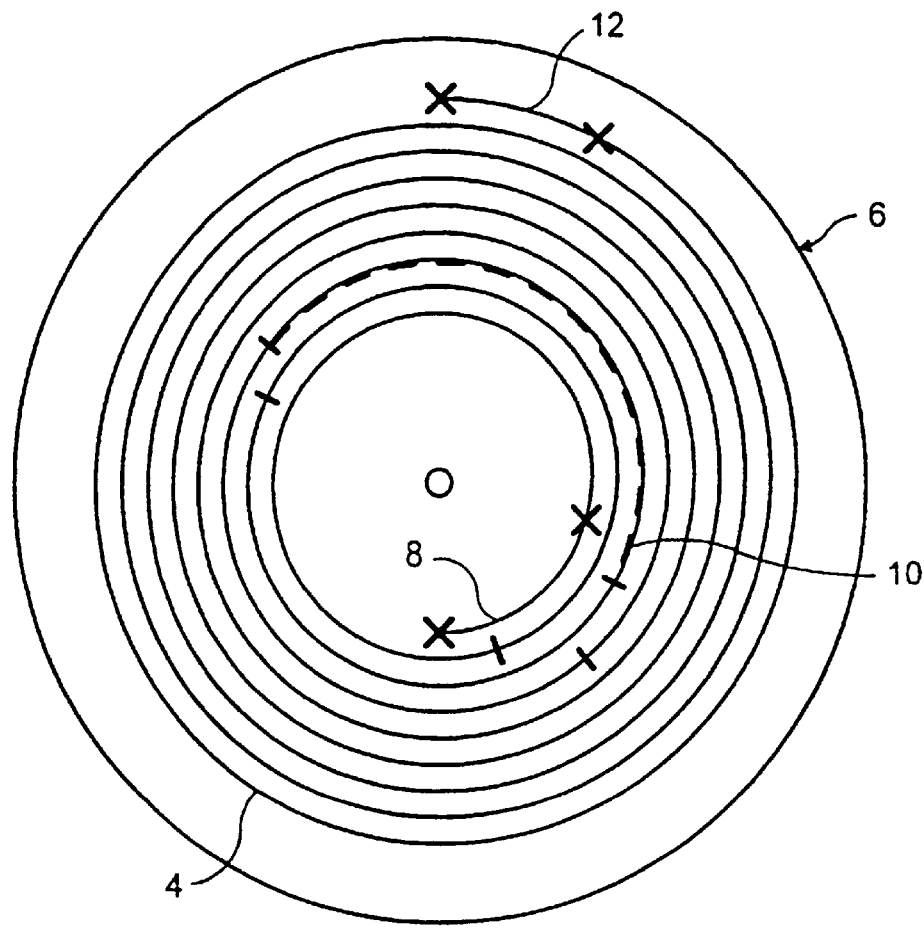
FIG. 1 shows schematically a compact disc showing the spiral data track.

FIG. 1 shows schematically the spiral track 4 on a CD 6. This spiral track 4 on a CD-DA is divided into a Lead-In 8, a number of successive music or audio tracks as 10, and a Lead-Out 12. The Lead-In track 8 includes a Table of Contents (TOC) which identifies for the player the tracks to follow, whilst the Lead-Out 12 gives notice that the track 4 is to end.

An audio player always accesses the Lead-In track 8 on start up. The music tracks may then be played consecutively as the read head follows the track 4 from Lead-In to Lead-Out. Alternatively, the player navigates the read head to the beginning of each audio track as required.

To the naked eye, a CD-ROM looks exactly the same as a CD-DA and has the same spiral track divided into sectors. However, data readers, such as CD-ROM drives, are much more sophisticated and are enabled to read data, and process information, from each sector of the compact disc according to the nature of that data or information. A data reader can navigate by reading information from each sector whereby the read head can be driven to access any appropriate part of the spiral track 4 as required.

To ensure that any data reader can read any CD-ROM, the compact discs and readers are also made to standards known, in this case, as the Yellow Book standards. These Yellow Book standards incorporate, but extend, the Red Book standards. Hence, a data reader, such as a CD-ROM drive, can be controlled to play a CD-DA.

The ability of a data reader to access, extract, or otherwise read the data on a CD-DA provides a problem for the music industry. A user can use his CD-ROM drive to read the data from an audio disc, for example, into a computer file, and then that data can be copied. The increasing availability of recorders able to record onto compact discs means that individuals and organisations now have easy access to technology for making perfect copies of audio compact discs. This is of great concern to the music industry.

An audio player, be it a dedicated compact disc music player, or a more sophisticated CD-ROM drive being controlled to play an audio disc, only looks for and uses data encoded to Red Book standards. What is more, if there appears to be an inaccuracy in the data, an audio player will generally continue to play rather than trying to correct the error. For example, if the read head has navigated to the start of a track and commenced to play that track, the audio player will continue to play that track to its end, even if it becomes apparent that there is some error in the timing information, for example. By contrast, a data reader is arranged to identify and correct errors. The present invention therefore suggests that errors should be deliberately introduced into the Red Book data, but that these errors should be of a type which are generally transparent to an audio player but which will interfere with the extraction or reading of the audio data by a data reader. By this means, the data reader is either unable to read the audio disc, and/or produces copies with degraded sound.

As the data encoding on a CD-DA and on a CD-ROM is well known and in accordance with the appropriate standards, it is not necessary to describe it in detail herein.

Figure 3:
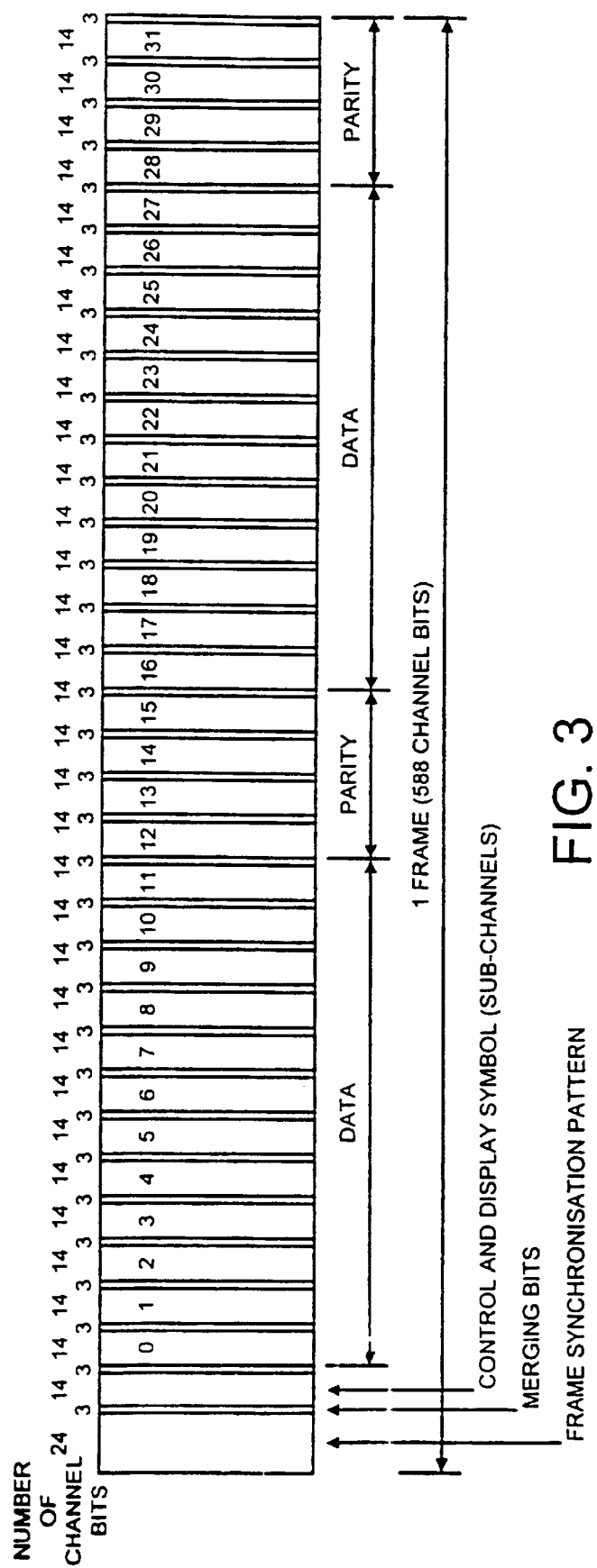
FIG. 3 shows the structure of a frame of data encoded on a CD.

Briefly, the data on a CD is encoded into frames by EFM (eight to fourteen modulation). FIG. 3 shows the format of a frame, and as is apparent therefrom, each frame has sync data, sub-code bits providing control and display symbols, data bits and parity bits. Each frame includes 24 bytes of data, which is audio data for a CD-DA. The subcode symbols, P, Q, R, S, T, U, V, W are arranged in subcode blocks and each has the sync patterns S0 and S1 as the first two symbols.

Figure 4:
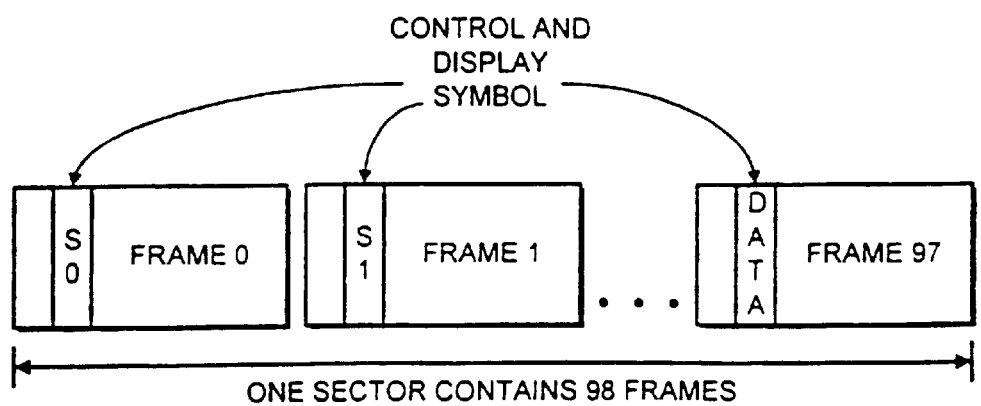
FIG. 4 shows a single sector in which a number of frames are grouped.

The standard requires that 98 such frames are grouped into a sector. The start of each sector is defined by the appearance of the symbol S0 as the subcode symbol of the first frame and by the appearance of the symbol S1 as the subcode symbol of the following frame, as is shown in FIG. 4.

Figure 2:
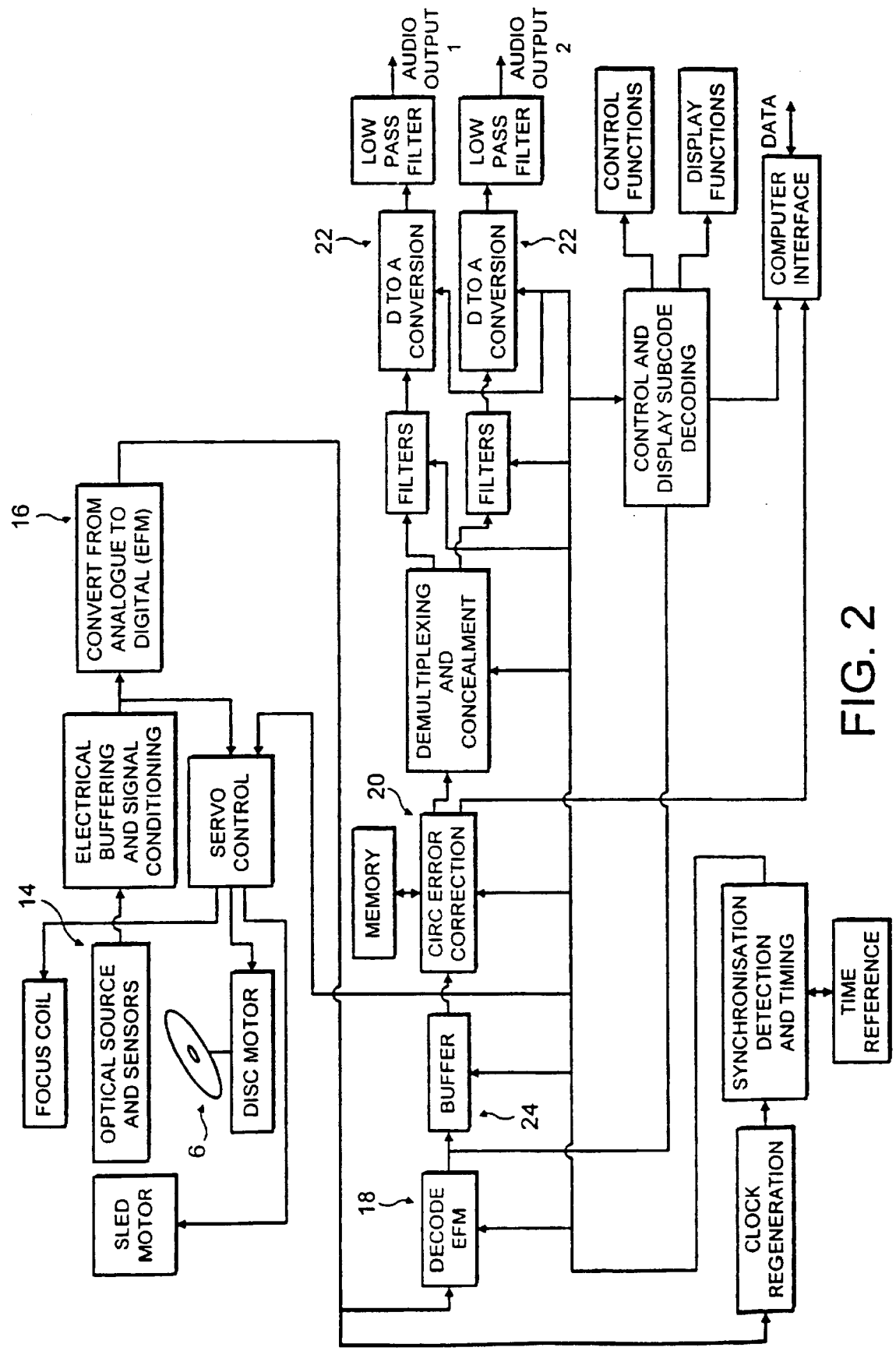
FIG. 2 shows a schematic of an audio player for CDs.

FIG. 2 shows schematically an audio player for a CD 6. As can be seen, the analogue signal detected by the optical system, generally referenced 14, is converted by converter 16 into digital EFM form. The EFM data is decoded at decoder 18 and is subject to error correction at stage 20. The resulting 24 bytes of data obtained from each frame are split into 4 byte samples and are clocked at a constant rate into a digital to analogue converter 22 to produce the audio output signal.

Figure 5:
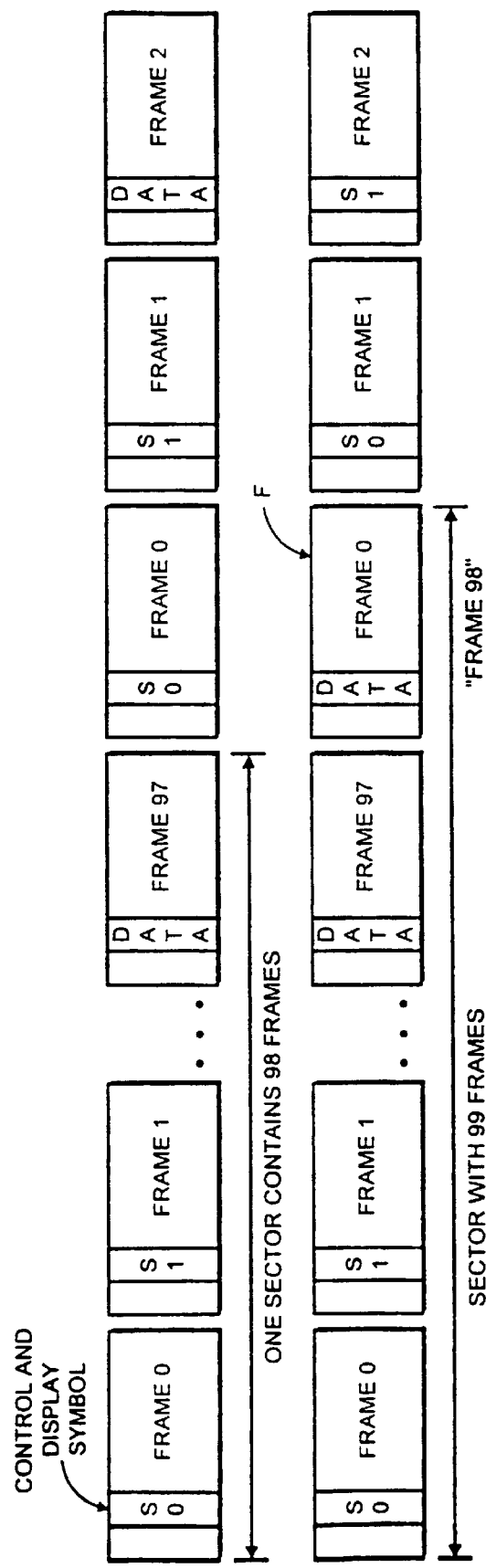
FIG. 5 shows a standard sector, as FIG. 4, together with a non-standard sector.
Figure 6A:
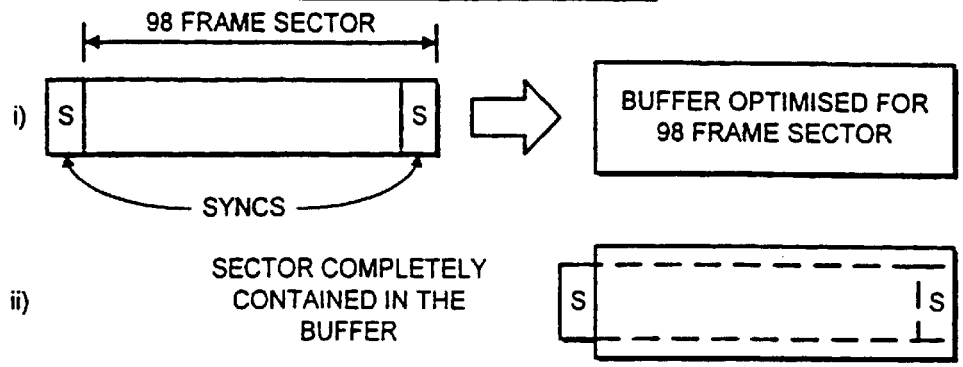
FIGS. 6a and 6b show the manner in which a data reader deals with sectors, FIG. 6a showing the receipt of standard sectors, and FIG. 6b showing the use of a non-standard sector.
Figure 6B:
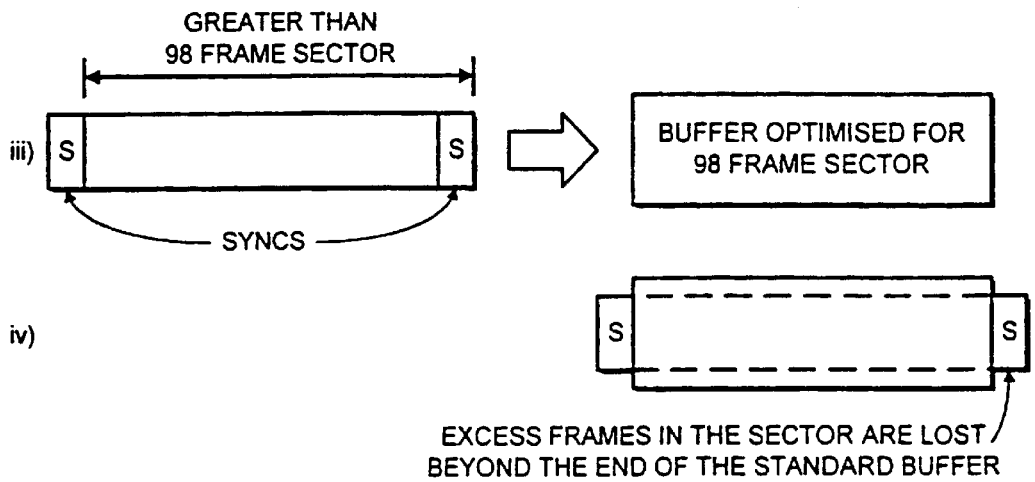

The present invention proposes that each sector should have a non-standard number of frames as illustrated in FIG. 5 where a standard 98 frame sector is shown adjacent a sector having 99 frames. In the non-standard arrangement shown in FIG. 5, the S0 and S1 sub-code synchronisation patterns are placed one frame later than they otherwise would be. The data within each frame remains the same. This means, therefore, that there is an extra frame F in each sector.

Figure 7:
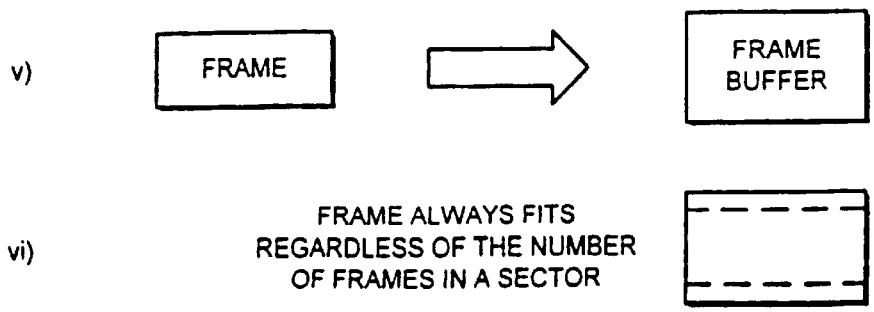
FIG. 7 illustrates the use by an audio player of frames of data arranged in a non-standard sector.

We have seen that in an audio player, the 24 bytes of data from each frame of a sector are divided into 4 byte samples. The audio player would treat a 99 frame sector, as shown in FIG. 5, in a similar manner as indicated in FIG. 7. However, a data reader arbitrarily decides how to break up each sector of 2352 bytes (98 frames×24 bytes) and the data reader is geared towards acquiring and manipulating 2352 byte sectors. With an extended sector having 99 frames, as shown in FIG. 5, the data reader will have to omit some of the bytes it has acquired from one sector. Effectively, the data reader will omit six samples every sector, or six samples every 1/75th of a second, and these omitted samples show up as phase noise.

Thus, if a data reader is used to read audio data from the CD-DA to enable a copy to be made the quality of sound from the resultant copy will be degraded.

A conventional audio player is affected by the larger number of frames in that the time counter will be somewhat slower when the disc is playing. This means that any time elapsed displays on the audio player may be inaccurate.

This invention shows that the use of sectors with a non-standard number of frames is effective to copy protect CD-DAs. Clearly, the number of frames in a sector can be chosen to meet particular circumstances. The upper or lower limits to the changes which can be made will depend, for example, upon factors such as the design of a particular data reader, and as to whether other incorrect or inaccessible control data is additionally incorporated on the disc.

It will be apparent that the method described and illustrated is just one example of a method in which the audio data obtained by reading a copy protected disc can be corrupted by the use of non-standard sectors. Other examples are possible. Furthermore, the nature of the corruption which results will depend not only upon the variations made to the structure of the data sectors, but also upon the design of the data reader used.

It will be appreciated that the non-standard sectors may be incorporated alone on a compact disc to provide copy protection. Alternatively, other incorrect or inaccessible control data may be additionally incorporated on the compact disc.

It will be appreciated that variations in and modifications to the embodiments described and illustrated may be made within the scope of this application.

What is claimed is:

1. A method of copy protecting a digital audio compact disc which has audio data and control data encoded thereon, the control data being arranged to facilitate playing and/or reading of the audio data on the line compact discs and the copy protection method comprising the steps selecting control data which is to be encoded onto the digital audio compact disc and rendering the selected control data incorrect and/or inaccurate in a manner such that the incorrect and/or inaccurate control data encoded on the compact disc interferes with the reading of audio data from the compact disc whilst not interfering with the playing of audio data from the compact disc, wherein the data is encoded on the compact disc in data sectors, and wherein the control data encoded on the compact disc which has been rendered incorrect is the structure of a data sector on the compact disc.

2. A method of copy protecting a digital audio compact disc according to claim 1, wherein the incorrect and/or inaccurate control data is arranged such that it cannot be corrected by the error correction arrangements of available data readers.

3. A copy protection method according to claim 1, wherein the data on the compact disc is encoded into frames which are grouped into a sector, and wherein the number of frames grouped in each sector is changed from the standard.

4. A copy protection method according to claim 1, wherein the control data encoded on the compact disc has been altered prior to mastering of the disc.

5. A copy protection method according to claim 4, comprising the step of changing the parameters of an encoder used in the mastering process to change the frame structure of the mastered disc.

6. A copy protected compact disc having audio data and control data encoded thereon, the control data being arranged to facilitate playing and/or reading of the audio data on the compact disc, wherein selected control data encoded on the compact disc has been rendered incorrect and/or inaccurate prior to its encoding onto the compact disc, the incorrect and/or inaccurate compact data being arranged to interfere with the reading of audio data from the compact disc whilst not interfering with the playing of audio data from the compact disc, wherein the data is encoded on the compact disc in data sectors, and wherein the control data encoded on the compact disc which has been rendered incorrect is the structure of a data sector on the compact disc.

7. A copy protected digital audio compact disc according to claim 6, wherein the incorrect and/or inaccurate control data is arranged such that it cannot be corrected by the error correction arrangements of available data readers.

8. A copy protected digital audio compact disc according to claim 6, wherein the data is encoded on the compact disc in frames, and the frames are grouped in sectors, wherein there is a non-standard number of frames in each sector.

9. A copy protected digital audio compact disc according to claim 6, wherein the compact disc has non-standard sectors only.

10. A copy protected digital audio compact disc according to claim 6, wherein the compact disc has non-standard sectors, and additionally has other control data which is incorrect and/or inaccurate.

11. A method of copy protecting a digital audio compact disc which has audio data and control data encoded thereon, the control data being arranged to facilitate playing and/or reading of the audio data on the compact disc and the copy protection method comprising the steps of selecting control data which is to be encoded onto the digital audio compact disc and rendering the selected control data incorrect and/or inaccurate in a manner such that the incorrect and/or inaccurate control data encoded on the compact disc interferes with the reading of audio data from the compact disc whilst not interfering wit the playing of audio data from the compact disc, wherein the data on the compact disc is encoded into frames which are grouped into a sector, and wherein the number of frames grouped in each sector is changed from the standard.

12. A copy protected compact disc having audio data and control data encoded thereon, the control data being arranged to facilitate playing and/or reading of the audio data on the compact disc, wherein selected control data encoded on the compact disc has been rendered incorrect and/or inaccurate prior to its encoding onto the compact disc, the incorrect and/or inaccurate control data being arranged to interfere with the reading of audio data from the compact disc whilst not interfering with the playing of audio data from the compact disc, wherein the data is encoded on the compact disc in frames, and the frames are grouped in sectors, wherein there is a non-standard number of frames in each sector.

* * * * *

UNITED STATES PATENT AND TRADEMARK OFFICE
CERTIFICATE OF CORRECTION

PATENT NO. : 6,839,312 B2
DATED : January 4, 2005
INVENTOR(S) : Heylen et al.

It is certified that error appears in the above-identified patent and that said Letters Patent is hereby corrected as shown below:

Column 5,
Line 18, delete "line".
Line 18, delete "discs" and insert -- disc --.
Line 19, insert -- of -- between "steps" and "selecting".

Column 6,
Line 31, delete "wit" and insert -- with --.

Signed and Sealed this

Twenty-first Day of June, 2005

JON W. DUDAS
*Director of the United States Patent and Trademark Office*